United States Patent
Lemaire et al.

(10) Patent No.: US 10,260,592 B2
(45) Date of Patent: Apr. 16, 2019

(54) HYDRAULIC ANTIVIBRATING DEVICE

(71) Applicant: HUTCHINSON, Paris (FR)

(72) Inventors: Gabriel Lemaire, Saint-Denis-les-Ponts (FR); Alain Bellamy, Ambloy (FR)

(73) Assignee: HUTCHINSON, Paris (FR)

( * ) Notice: Subject to any disclaimer, the term of this patent is extended or adjusted under 35 U.S.C. 154(b) by 0 days.

(21) Appl. No.: 15/660,475

(22) Filed: Jul. 26, 2017

(65) Prior Publication Data

US 2018/0031072 A1    Feb. 1, 2018

(30) Foreign Application Priority Data

Jul. 26, 2016 (FR) ..................... 16 57187

(51) Int. Cl.

| F16F 13/26 | (2006.01) |
|---|---|
| F16F 13/10 | (2006.01) |
| F02B 1/04 | (2006.01) |
| B60G 13/14 | (2006.01) |
| H02K 7/18 | (2006.01) |

(52) U.S. Cl.
CPC .............. *F16F 13/264* (2013.01); *F02B 1/04* (2013.01); *F16F 13/105* (2013.01); *B60G 13/14* (2013.01); *H02K 7/1823* (2013.01)

(58) Field of Classification Search
CPC ........ F16F 13/26; F16F 13/262; F16F 13/264; F16F 13/266; F16F 13/268; F16F 13/105; B60G 13/14; H02K 7/1853
USPC ....................................... 267/140.14, 140.15
See application file for complete search history.

(56) References Cited

U.S. PATENT DOCUMENTS

| 5,209,462 | A | * | 5/1993 | Le Fol | .................. | F16F 13/264 |
|---|---|---|---|---|---|---|
| | | | | | | 267/140.14 |
| 5,911,412 | A | * | 6/1999 | Durand | ................... | F16F 13/26 |
| | | | | | | 267/140.13 |
| 6,364,294 | B1 | * | 4/2002 | Gennesseaux | ........ | F16F 13/264 |
| | | | | | | 267/140.13 |
| 7,416,173 | B2 | * | 8/2008 | Tanaka | .................. | F16F 13/262 |
| | | | | | | 267/140.13 |
| 9,709,123 | B2 | * | 7/2017 | Kim | ...................... | F16F 13/266 |
| 2006/0287788 | A1 | * | 12/2006 | Ichikawa | .............. | F16F 13/264 |
| | | | | | | 701/36 |
| 2009/0102105 | A1 | * | 4/2009 | Hasegawa | ............. | F16F 13/262 |
| | | | | | | 267/122 |

(Continued)

FOREIGN PATENT DOCUMENTS

| EP | 0 621 418 A2 | 10/1994 |
|---|---|---|
| WO | WO 2015/136160 A1 | 9/2015 |

OTHER PUBLICATIONS

French Search Report Application No. FR 16 57187 dated Apr. 21, 2016.

*Primary Examiner* — Thomas J Williams
(74) *Attorney, Agent, or Firm* — Miller, Matthias & Hull LLP

(57) ABSTRACT

Vibration damping device comprising two armatures and an elastomer body that connects armatures together and which delimits a first hydraulic chamber that communicates with a second hydraulic chamber that can be deformed by a constricted passage. A sealed box, integral with the second armature, contains a control device and an actuator. The box is sealed and comprises at least one flexible wall separating from the atmosphere, the interior space of the box.

8 Claims, 9 Drawing Sheets

(56) References Cited

U.S. PATENT DOCUMENTS

| | | | |
|---|---|---|---|
| 2012/0049424 A1* | 3/2012 | Bradshaw | F16F 13/262 267/140.14 |
| 2014/0014450 A1* | 1/2014 | West | F16F 9/10 188/298 |
| 2016/0273609 A1* | 9/2016 | McDonough | F16F 13/26 |
| 2018/0031073 A1* | 2/2018 | Lemaire | F16F 13/10 |

* cited by examiner

HYDRAULIC ANTIVIBRATING DEVICE

CROSS-REFERENCE TO RELATED APPLICATION

This application claims priority under the Paris Convention to French Patent Application No. 16 57187 filed on Jul. 26, 2016.

FIELD OF THE DISCLOSURE

This invention relates to hydraulic vibration damping devices.

More particularly, the invention relates to a hydraulic vibration damping device intended to be placed for the purposes of damping between first and second rigid elements, with this vibration damping device comprising:
- first and second armatures intended to be fastened to the two rigid elements to be joined,
- an elastomer body that connects the first and second armatures together and which delimits at least partially a first hydraulic chamber,
- a second hydraulic chamber which is delimited by a deformable wall and which communicates with the first hydraulic chamber by the intermediary of a constricted passage, with the first and second hydraulic chambers and with the constricted passage forming a hydraulic circuit filled with liquid,
- a closed box integral with the second armature and delimiting an interior space separated from the second hydraulic chamber by said deformable wall,
- and an electrical system comprising a control device, at least one sensor and an actuator controlled by the control device according to information received from the sensor, said actuator being suited to control the vibration damping behaviour of the vibration damping device, and at least the control device being arranged in the interior space of said box.

BACKGROUND OF THE DISCLOSURE

Document WO2015/136160 discloses an example of a vibration damping device of this type.

SUMMARY OF THE DISCLOSURE

This invention has in particular for object to perfect the vibration damping devices of the type hereinabove, in particular in order to simplify the electrical system and to reduce the cost of it.

To this effect, according to the invention, a vibration damping support of the type in question is characterised in that the microturbine is shaped to be driven always in the same direction of rotation by the liquid when the liquid is moving alternatively in the first and second directions in the constricted passage.

Thanks to these arrangements, the electrical system is not exposed to humidity or to other exterior aggressions; therefore it can be carried out in a simpler and less expensive manner.

In various embodiments of the vibration damping device according to the invention, recourse may furthermore possibly be had to one and/or the other of the following arrangements:
- the actuator is also contained in the interior space of the box;
- the sensor is also contained in the interior space of the box;
- the electrical system further comprises a device for generating electric current that comprises on the one hand, a microturbine rotatably mounted in the constricted passage and on the other hand, a generator coupled to the microturbine in order to produce an electric current when the microturbine is rotating, with at least the generator being contained in the interior space of the box;
- the electrical system further comprises:
  - a converter suited for converting into direct current an electric current produced by the generator,
  - a device for storing electrical energy supplied by the converter and supplying the control device,
  with the converter and the device for storing electrical energy being arranged in the interior space of the box;
- said sensor is a vibration sensor;
- said actuator is suited to selectively block or leave free a mobile wall which partially delimits the first hydraulic chamber;
- the vibration damping device further comprises a pneumatic chamber which is delimited towards the actuator by a bottom provided with an orifice and which is separated from the first hydraulic chamber by a flexible wall,
  with the actuator comprising a mobile actuating member between first and second positions, with said actuating member being elastically solicited by a spring towards the first position, with the actuating member being suited for closing off said orifice under the bias of the spring when said actuating member is in the first position, with the spring being suited to allow the actuating member to temporarily open said orifice in case of excessive pressure in the pneumatic chamber.

BRIEF DESCRIPTION OF THE DRAWINGS

Other characteristics and advantages of the invention shall appear in the following description of two of its embodiments, provided as non-limiting examples, with respect to the attached drawings.

In the drawings.

DETAILED DESCRIPTION OF THE DISCLOSURE

Figure 1:
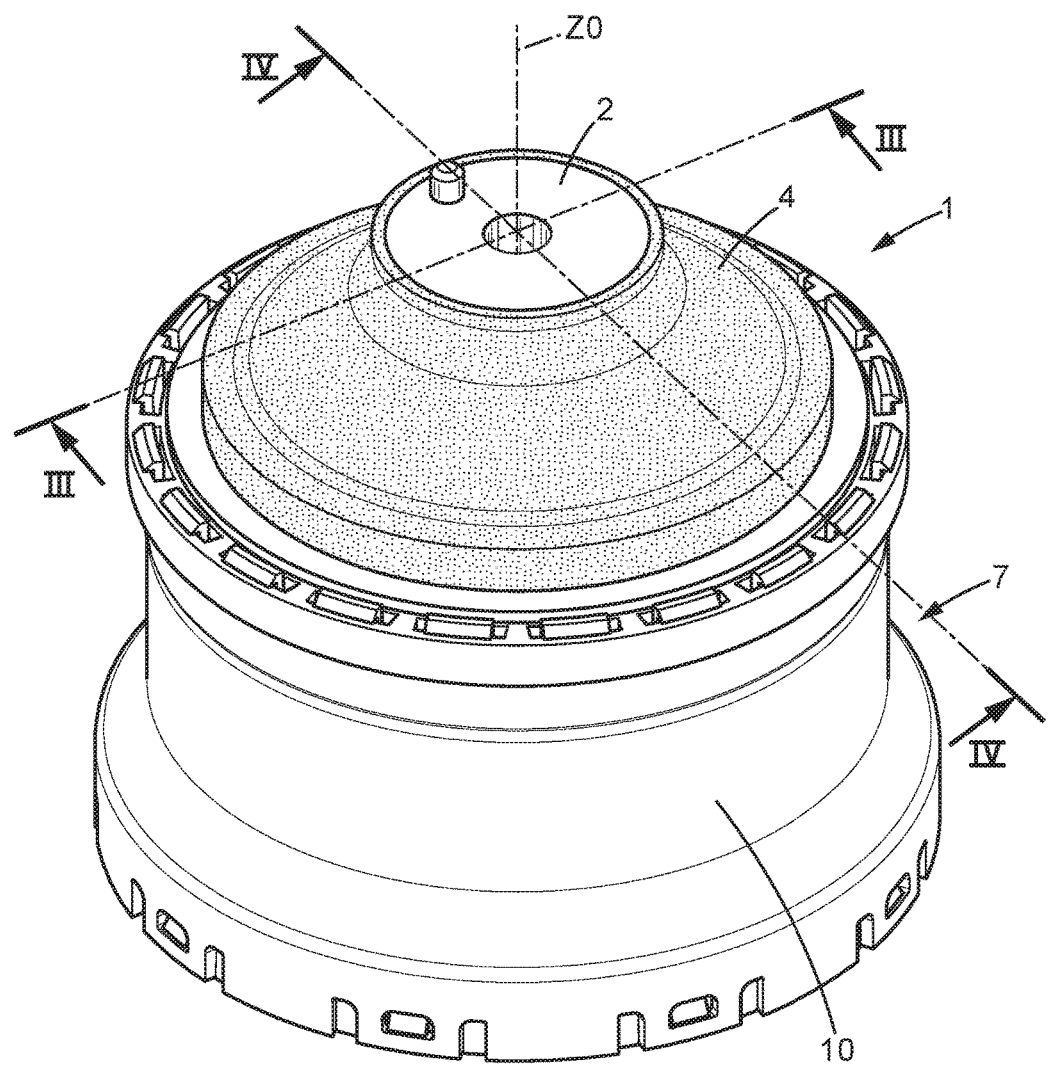
FIGS. 1 and 2 are perspective views, respectively of three-quarters of the top and of three-quarters of the bottom, of a vibration damping device according to an embodiment of the invention.
Figure 2:
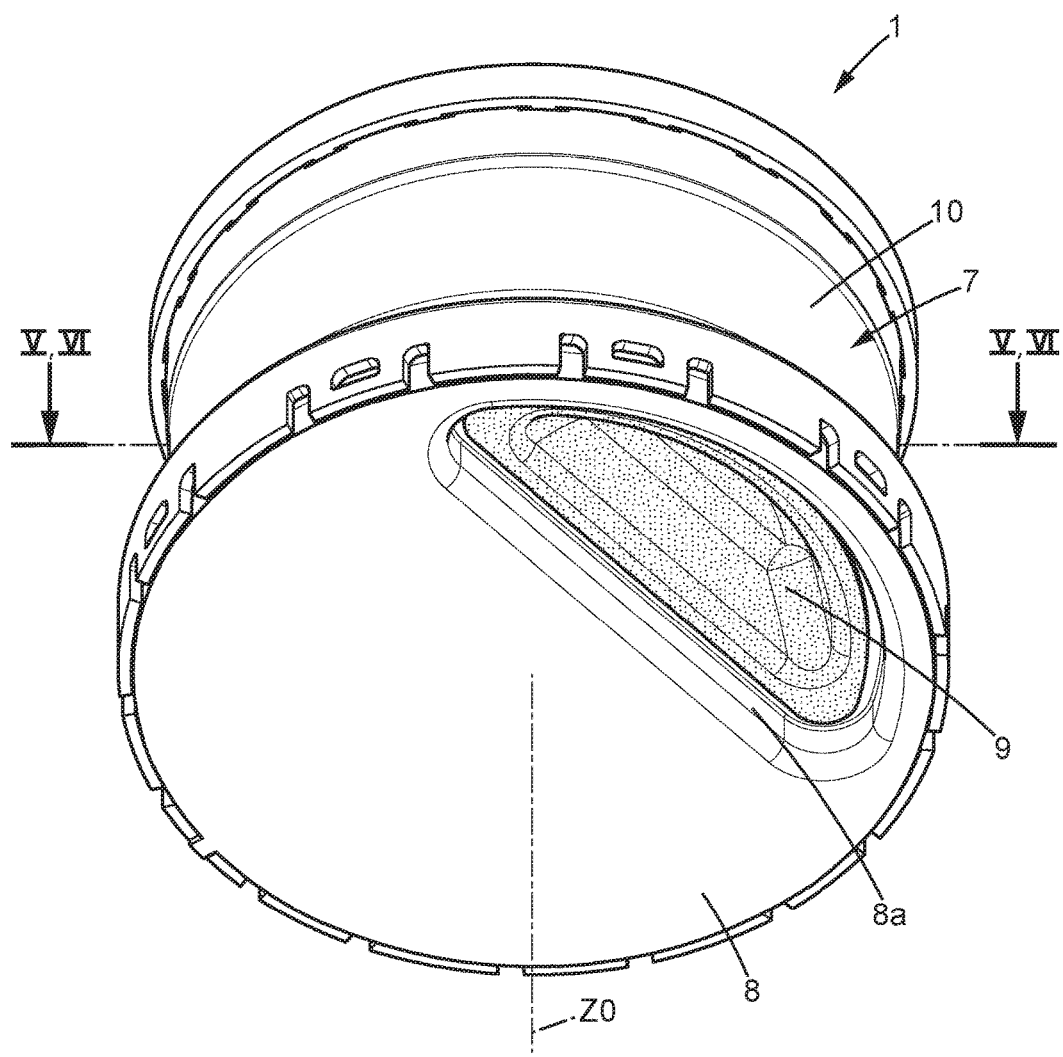
Figure 3:
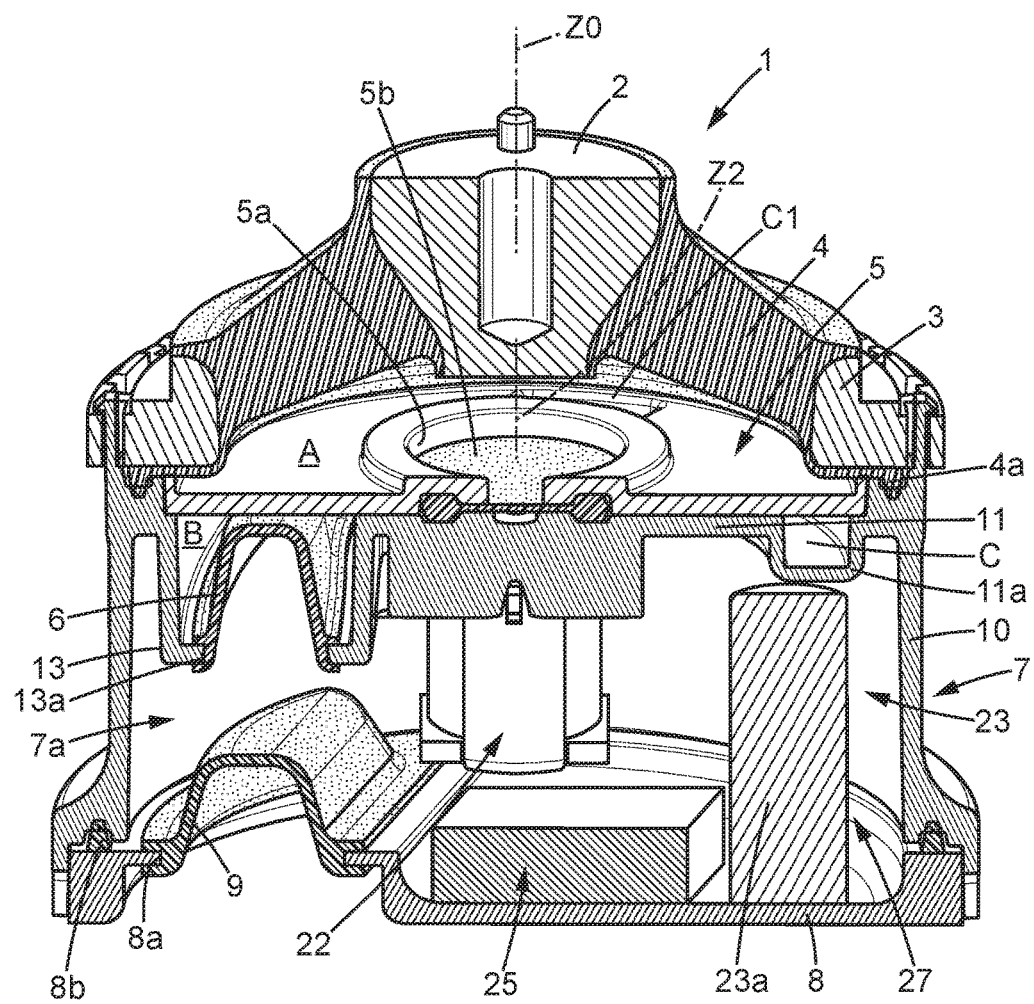
FIGS. 3 and 4 are perspective views of the vibration damping device of FIGS. 1 and 2, as an axial cross-section respectively according to the lines and Iv-Iv of FIG. 1, FIGS. 5 and 6 are perspective views of the vibration damping device of FIGS. 1 and 2, as a radial cross-section respectively in two different radial planes, and the annular lateral wall of the box of the device being suppressed for increased clarity in FIG. 6, FIGS. 7 and 8 are perspective views of the actuator of the vibration damping device of FIGS. 1 to 6, respectively of three-quarters of the top and of three-quarters of the bottom.

In the various figures, the same references designate identical or similar elements.

FIGS. 1 to 4 show a hydraulic vibration damping device 1, comprising:
- a first rigid armature 2 having for example the shape of a metal base and intended to be fastened in particular to the engine of a vehicle in order to support it,
- a second rigid armature 3, for example an annular armature made of metal or of plastic material, which is intended to be fastened for example to the body of the vehicle,
- an elastomer body 4 able to support in particular the static forces due to the weight of the engine of the vehicle and connecting the first and second armatures 2, 3, with this elastomer body able to have for example a bell shape that extends axially along an axis Z0 for example vertical, between a top bonded and overmolded onto the first armature 2 and an annular base overmolded and bonded onto the second armature 3.

The vibration damping device 1 further comprises a deformable partition 5 radial with respect to the axis Z0, integral with the second armature 3 and applied in a sealed manner against the base of the elastomer body.

The partition 5 delimits with the elastomer body 4 a first hydraulic chamber A, here a working chamber. The working chamber A communicates through a constricted passage C with a second hydraulic chamber B, here a compensating chamber, partially delimited by a deformable wall, in particular a flexible membrane made of elastomer 6 forming a bellows. The working chamber A, the compensating chamber B and the constricted passage C together form a hydraulic circuit filled with liquid, in particular with glycol or other.

The constricted passage C is sized to have a resonance frequency for example between 5 and 20 Hz, typically between 8 and 12 Hz, which corresponds to the hashed movements due to the rolling of the vehicle.

Moreover, the vibration damping device further comprises a box 7, which is integral with the second armature 3 and extends opposite the first armature 2 from the second armature 3.

The box 7 can possibly be made from a plastic material, in particular moulded.

The box 7 can be carried out in two parts:
- a main part that comprises an annular lateral wall 10 extending axially along the axis Z0 between a first end adjacent to the first armature 2 and a second open end separated from the second armature 3,
- and a bottom 8 that closes the second end of the annular wall 10.

The first end of the annular wall 10 is integral with the second armature 3 for example by snap-fitting, or by any other known means. An annular seal 4a can be inserted between the first end of the lateral wall 10 and the second armature 3. This seal 4a can advantageously be formed by a portion of the base of the elastomer body 4.

The second end of the annular wall 10 is integral with the bottom 8 for example by snap-fitting, or by any other known means. An annular seal 8b can be inserted between the second end of the lateral wall 10 and the bottom 8. The interior volume 7a delimited by the box 7 is as such isolated in a sealed manner with respect to the exterior.

The bottom 8 can comprise a cover 8a that is closed off in a sealed manner by an easily deformable wall such as a flexible membrane made of elastomer 9 forming a bellows, which makes it possible to maintain the interior space 7a of the box 7 at atmospheric pressure independently of the movements of the flexible membrane 6 or of the variations in temperature.

The main part of the box further comprises a transversal wall 11, perpendicular to the axis Z0, which is in contact with the partition 10. The transversal wall 11 is integral with the annular wall 10 and closes the interior space 7a of the box in the vicinity of the first end of said lateral wall 10. The transversal wall 11 can be moulded as a single piece with the annular wall 10.

The transversal wall 11 can comprise a groove 11a opened towards the partition 5 and covered by said partition 5. The groove 11a delimits the constricted passage C with the partition 5. The constricted passage C can communicate with the working chamber A via an opening arranged in the partition 5.

The transversal wall 11 can furthermore have a recess 13 (FIG. 3) open towards the partition 5 and covered by said partition 5. The groove 11a opens into the recess 13. The recess 13 can comprise a cover 13a closed off by the aforementioned flexible membrane 6. The recess 13, the membrane 6 and the partition 5 together delimit the compensating chamber B.

The transversal wall 11 can furthermore comprise a bowl 12 of which the concave surface 12a is arranged facing a recess 5a arranged in the partition 5. The recess is closed off by a flexible membrane 5b made of elastomer that covers the bowl 12. The bowl 12 delimits with the flexible membrane 5b a pneumatic chamber P, which communicates with the interior space 7a of the box 7, via an orifice 12b arranged in the bowl 12. The orifice 12b can be centred on an axis Z2 parallel to the axis Z0.

The box 7 can furthermore comprise a housing 14, for example of cylindrical shape, which can be formed in a single piece with the lateral wall 10 and the transversal wall 11, and arranged under the transversal wall 11. The constricted passage C can comprise a first part C1 which has the working chamber A communicate with the interior of the housing 14, and a second part C2 which has the interior of the housing 1 communicate with the compensating chamber B.

Figure 4:
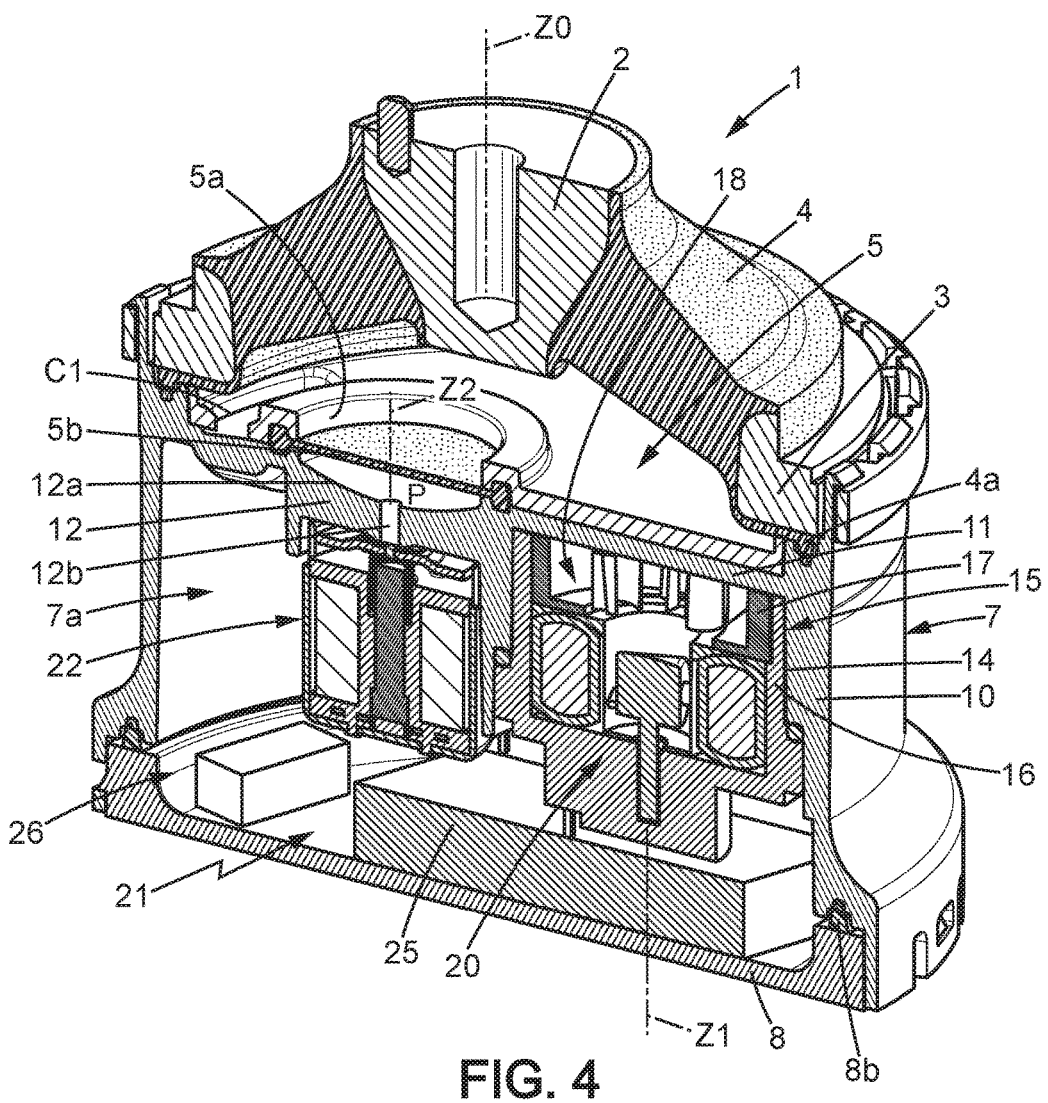
Figure 5:
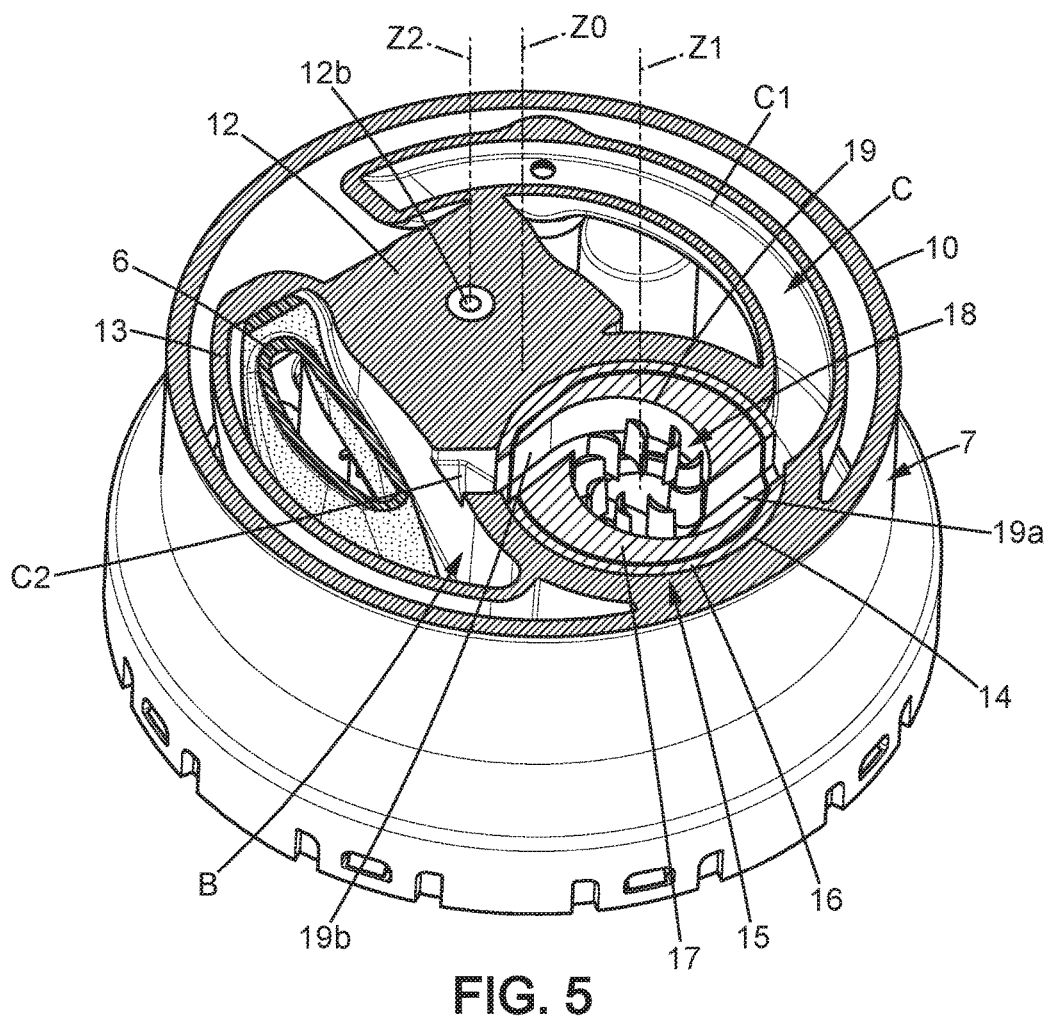
Figure 6:
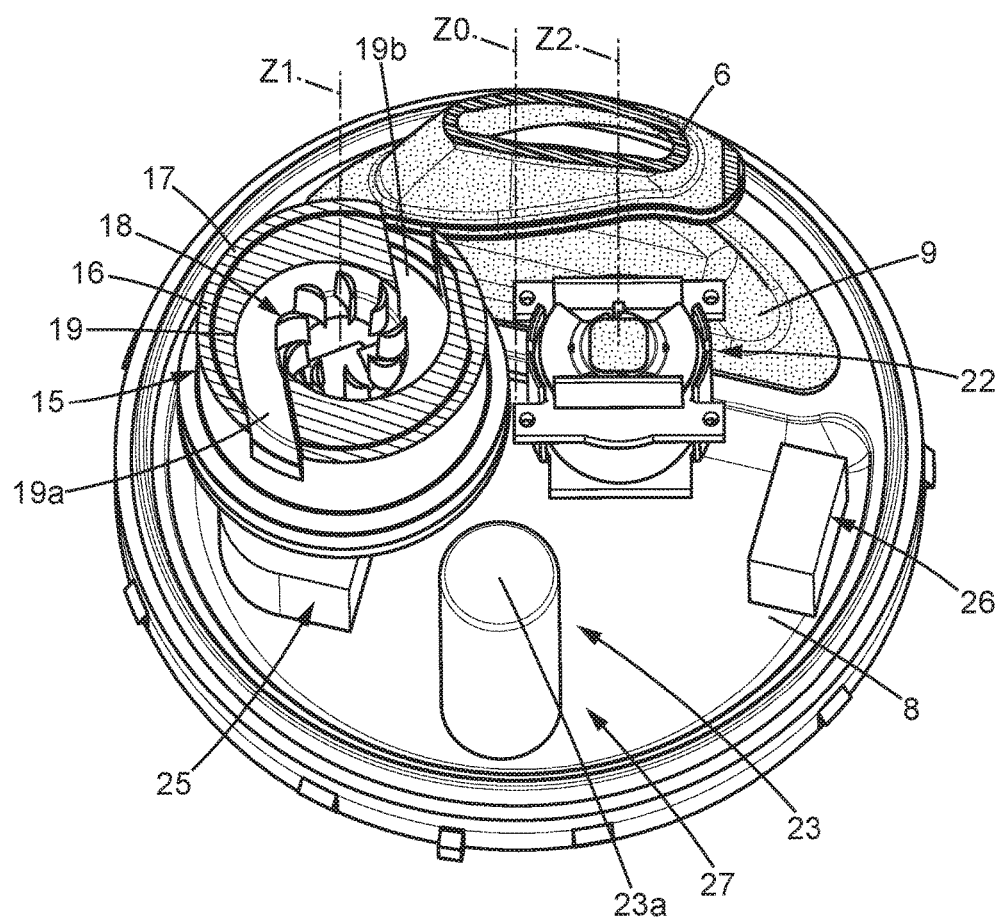
Figure 7:
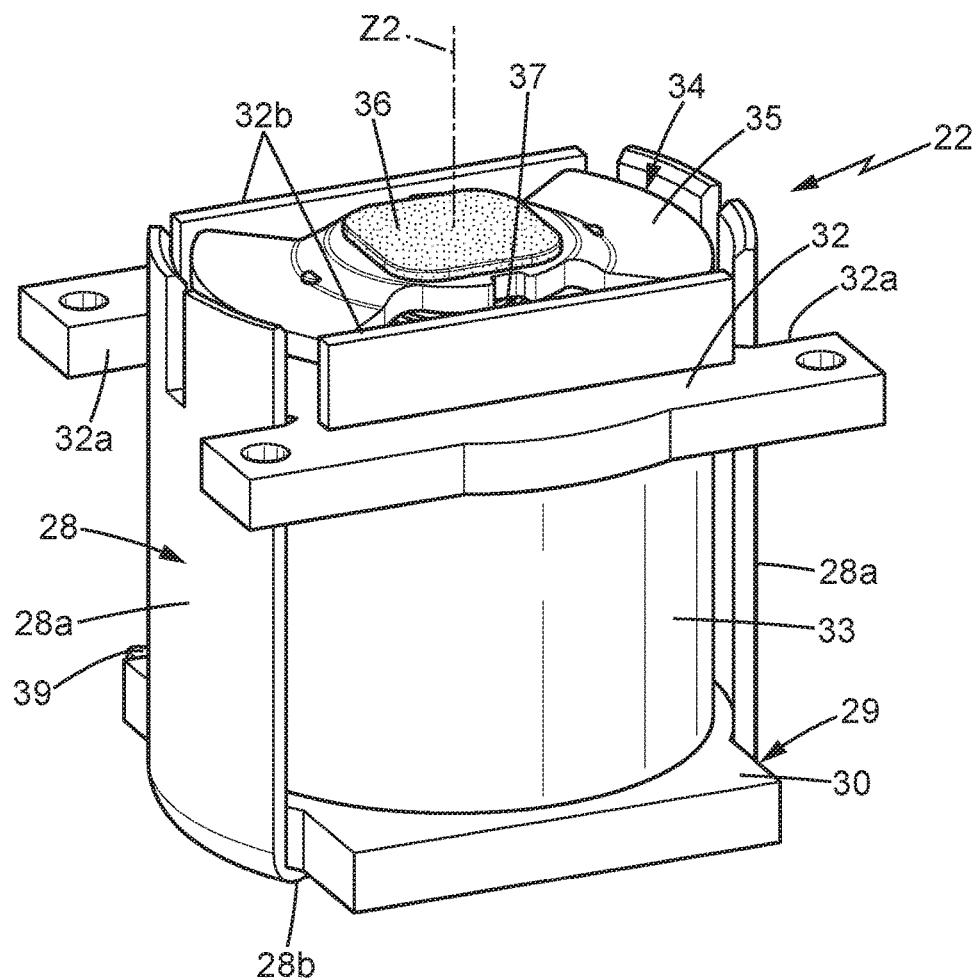
Figure 8:
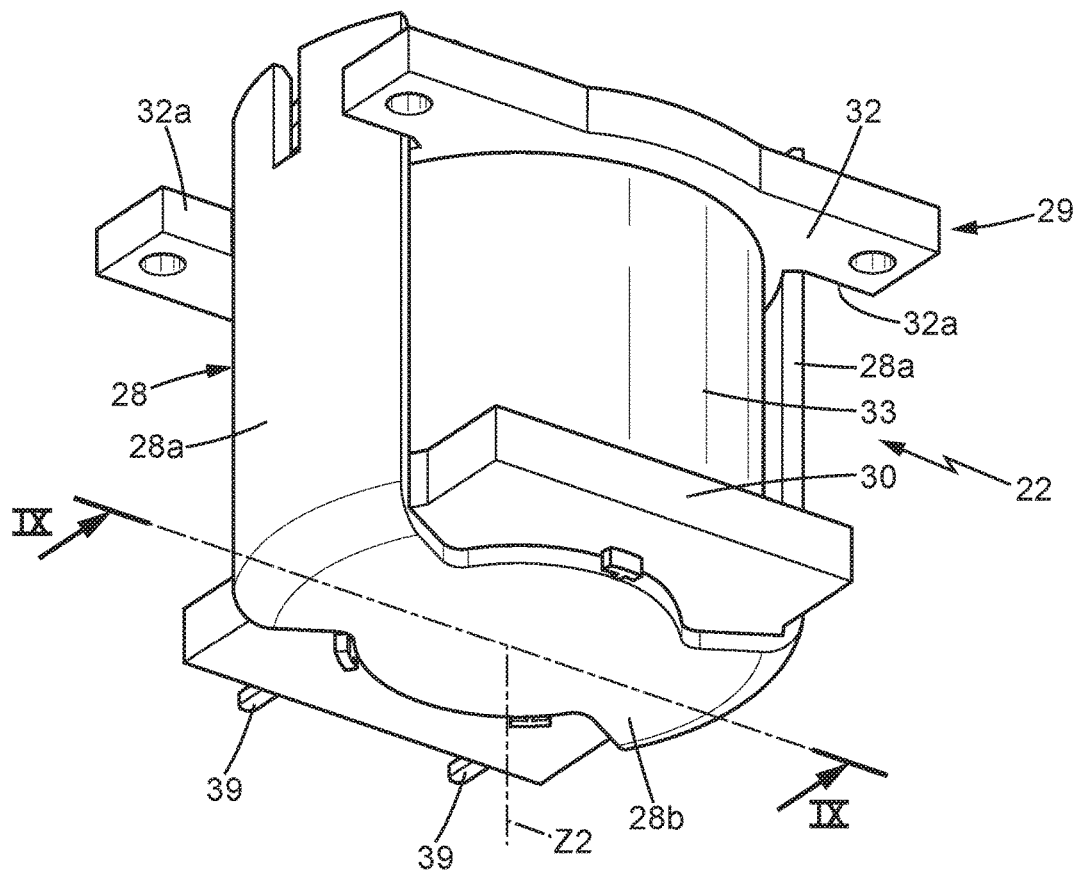

The housing 14 can receive via nesting, an outer casing 16 of a device for generating electric current 15. As shown in FIGS. 4 to 6, the device for generating electric current 15 can comprise a microturbine casing 17, delimiting a microturbine chamber 19 wherein a microturbine 18 is rotatably mounted about an axis of rotation Z1, for example parallel to the axis Z0. The microturbine chamber 19 can have a substantially cylindrical shape centred on the axis of rotation Z1, and it can communicate respectively with the first and second parts C1, C2 of the constricted passage, via two nozzles 19a, 19b delimited by the microturbine casing 17. The two nozzles 19a, 19b can advantageously substantially open tangentially into the microturbine chamber 19. The nozzles 19a, 19b can open into the microturbine chamber 19 in positions that are substantially diametrically opposite with respect to the axis of rotation Z1.

Advantageously, the microturbine 18 is shaped to be driven always in the same direction of rotation by the liquid of the hydraulic circuit when said liquid is moving alternatively in the opposite first and second directions in the constricted passage C.

The microturbine 18 and the microturbine chamber 19 can be for example such as described in the aforementioned document WO2015/136160.

As shown in FIG. 4, the device for generating electric current 15 further comprises a generator 20 coupled to the microturbine 18 in order to produce an electric current when the microturbine 18 is rotating. This generator can be for example such as described in the aforementioned document WO2015/136160.

Figure 10:
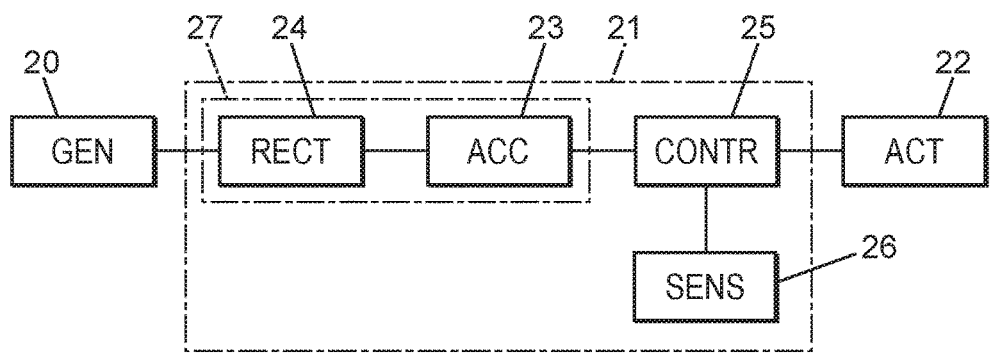
FIG. 10 is a block diagram of the electronic circuit provided on the vibration damping device of FIG. 1.

As shown in FIGS. 4, 6, 10, the vibration damping device 1 further comprises an electronic circuit 21 that controls an electromagnetic actuator 22 which is suited to selectively block or leave free the flexible membrane 5b (or more generally, the electromagnetic actuator 22 is suited to control the vibration damping behaviour of the vibration damping device, possibly by acting on an element other than the flexible membrane 5b).

The electronic circuit 21 can comprise for example:
- a converter 24 (RECT) supplied by the generator 20 (GEN) and which generates a direct current from the alternating current produced by said generator 20,
- a device for storing electrical energy 23 (ACC), for example a capacitor 23a (or a set of several capacitors) supplied by the converter 24,
- a control device 25 (CONTR), for example comprising a microcontroller, supplied by the storage device 23 and controlling the actuator 22 (ACT),
- a sensor 26 (SENS) connected to the control device 25, for example a vibration sensor such as an accelerometer or other.

The entire electronic circuit 21 can be housed in the interior space 7a of the box 7, and does not require exchanging information with the exterior or an external electrical power supply.

Because the box 7 is sealed, the electronic circuit 21 does not need any special protection from humidity and exterior aggressions, which reduces the cost of the vibration damping device.

Possibly, the sensor 26 or an additional sensor, could be arranged elsewhere than in the box 7 (for example, it could be rigidly connected to the first armature 2), according to the application considered and the mounting of the vibration damping device 1.

As shown in FIGS. 4 and 7-9, the actuator 22 can for example comprise a valve 36 suited to selectively open and close the orifice 12b of the pneumatic chamber P in order to selectively isolate it or to place it at atmospheric pressure (i.e. at the pressure inside the box 7).

This valve 36 can advantageously also act as a flap, as shall be explained hereinafter, by allowing only the outlet of air from the pneumatic chamber P towards the interior space 7a of the box 7 when the valve 36 closes the orifice 12b, but not the reverse.

Advantageously, the actuator 22 comprises a permanent magnet holding mechanism comprising:
- a magnetic circuit 28, 34, 40 which includes an actuating member 34 which includes or carries the abovementioned valve 36 and which is mobile between a first position (not shown) wherein the valve 36 is applied under the bowl 12 by closing the orifice 12b, and a second position (shown in the figures) of opening the orifice 12b wherein the valve 36 is at a distance from the wall of the bowl 12,
- at least one spring 37 biasing the actuating member 34 with a first force directed towards the first position,
- at least one permanent magnet 41 creating a permanent magnetic field B0 in the magnetic circuit and biasing the actuating member 34 with a second force directed towards the second position, with the first force being greater than the second force when the actuating member 34 is in the first position and with the second force being greater than the first force when the actuating member 34 is in the second position,
- at least one coil 33 electrically supplied by the control device 25.

The control device 25 controls the passing from the second position to the first position by creating a current in a first direction in the coil 33, which creates a magnetic field B1 in the opposite direction of the aforementioned permanent magnetic field B0, in such a way as to decrease the resulting magnetic field sufficiently so that the spring 37 moves the actuating member 34 into the first position.

Inversely, the control device 25 controls the passing from the first position to the second position by creating a current in the coil 33, in a second direction opposite the first direction, which creates a magnetic field B'1 in the same direction as the aforementioned permanent magnetic field B0, in such a way as to increase the resulting magnetic field sufficiently to overcome the force of the spring 37 and displace the actuating member 34 in the second position.

Advantageously, the control device 25 is suited for generating a simple pulse of current in the coil 33 in order to selectively pass the actuating member 34 either from the first to the second position or from the second to the first position.

The pulse of current can have a duration t less than 100 ms.

The pulse of current can moreover have a power p between 0.1 W and 1.5 W.

The electrical energy $E=p.t$ consumed by a transition between the two positions of the actuating member, is therefore very low, which contributes to the power autonomy of the vibration damping device 1, and moreover makes it possible to reduce the size, the weight and the cost of the coil 33.

The actuating member 34 is mobile in translation along the axis Z2, for example over a course h between 0.5 and 2 mm, advantageously between 0.7 and 1.5 mm, between the first and second positions. Such a movement of low amplitude is sufficient in this case, and also contributes to limiting the energy consumed by each transition between the two positions of the actuating member 34.

In the particular example shown, the aforementioned magnetic circuit can comprise:
- a ferromagnetic shell 28 in the shape of a U having a base 28b and two wings 28a extending to the free ends on either side of the axis Z2,
- a pallet 35 made of ferromagnetic material which belongs to the actuating member 34 and carries the valve 36 (the valve 36 can be an elastomer pad, for example overmoulded on the pallet 35), with the pallet 35 being mobile along the axis Z2 and arranged between the free ends of the two wings 28a with a low air gap e left between the pallet 35 and each wing 28a,
- a core 40 made of ferromagnetic material integral with the shell 28 and extending longitudinally along the axis Z2 between a first end close to the base 28b and a second end close to the pallet 35 of the actuating member, with the pallet 35 being separated from the second end of the core 40 in the first position and in contact with the second end of the core in the second position, and with the coil 33 being wound around said core.

The permanent magnet 41 can be inserted axially between the first end of the core 40 and the base 28b of the shell.

The coil 33 can be wound on a support 29 made of a plastic material or other. The support 29 can comprise:
- a base 30 perpendicular to the axis Z2 and arranged on the base 28b, in contact with said base 28b,
- a core 31 extending along the axis Z2 and delimiting an axial chimney 36 wherein the ferromagnetic core 40 is nested without play, with the axial chimney 36 having a first widened part 36a close to the actuating member 34 and a second widened part close to the base 30, with the first widened part 36a forming a shoulder against which the spring 37 bears in order to push the actuating member 34 towards the first position, and with the second widened part 36b receiving a widened part of the core 40 in such a way as to axially maintain the core 40 against the permanent magnet 41 and the permanent magnet 41 against the base 28b, a flange 31 arranged under the actuating member 34, with the core 40 and the spring 37 protruding outside of the flange 32 towards the pallet 35.

The flange 32 can comprise cutouts 32a wherein the wings 28a of the shell 28 are nested.

The flange 32 can also comprise guides 32b which protrude axially along the axis Z2 towards the bowl 12 and bear under said bowl 12. These guides 32b can surround the pallet 35 in order to guide it in its axial movement and guaranteeing the correct axial positioning of the electromagnetic actuator 22.

The base 29 can comprise electrical contacts 39, which connect the coil 33 to the control device 25.

The vibration damping device 1 that has just been described functions as follows.

When the vehicle in which the vibration damping device is installed is operating, the vibratory movements of the engine produce movements of liquid in the constricted passage C between the hydraulic chambers A and B. These movements of liquid set the microturbine 18 into rotation, in such a way that the generator generates an electric current which is rectified by the converter 24 and stored in the storage device 23.

When the engine is operating on idle without the vehicle rolling, the relative movements between the first and second armatures 2, 3 are generally of a frequency between 10 and 40 Hz according to the type of engine and of a low amplitude (less than 0.2 mm). In these conditions, the electrical power produced by the generator 20 is relatively low, for example from a few dozen to a few hundred milliwatts. In these circumstances, detected using the sensor 26, the control device 25 controls the actuator 22 so that the actuating member 34 is in the second position, in such a way as to leave free the flexible membrane 5b which then has the effect of decoupling which prevents transmitting the vibrations from the engine to the body of the vehicle.

When the vehicle is rolling, the relative movements referred to as hashing between the first and second armatures 2, 3 are of a relatively low frequency (generally between 10 and 15 Hz according to the type of engine) and of a great amplitude (greater than 0.3 mm). In these conditions, the electrical power produced by the generator 20 can be more substantial, for example a few Watts (for example about 2 W). In these circumstances, detected using the sensor 26, the control device 25 controls the actuator 22 so that the actuating member 34 is in the first position. In this position, with the spring being suited to allow the actuating member 34 to temporarily open the orifice 12b in case of excessive pressure in the pneumatic chamber P. As such, the pneumatic chamber P is progressively emptied of its air towards the inside of the box 7, under the effect of the movements of the flexible membrane 5b due to the vibratory movements of the engine, in such a way that the mobile wall is progressively thrust against the concave surface 12a of the bowl 12 as the emptying takes place in the pneumatic chamber P, which blocks the flexible membrane 5b.

Two different operating modes of the vibration damping device are thus obtained 1 according to the engine speed, detected by the sensor 26.

Figure 11:
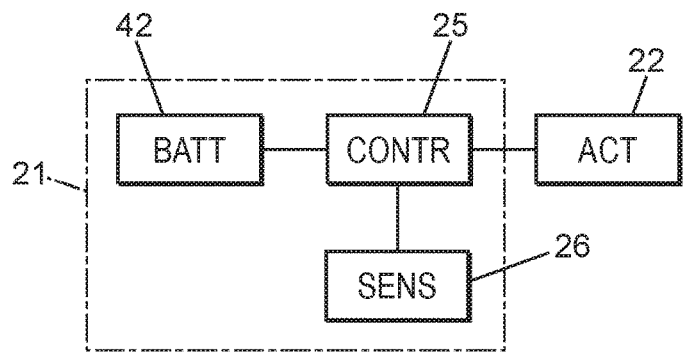
FIG. 11 is a block diagram similar to that of FIG. 10, in a second embodiment of the invention.
Figure 9:
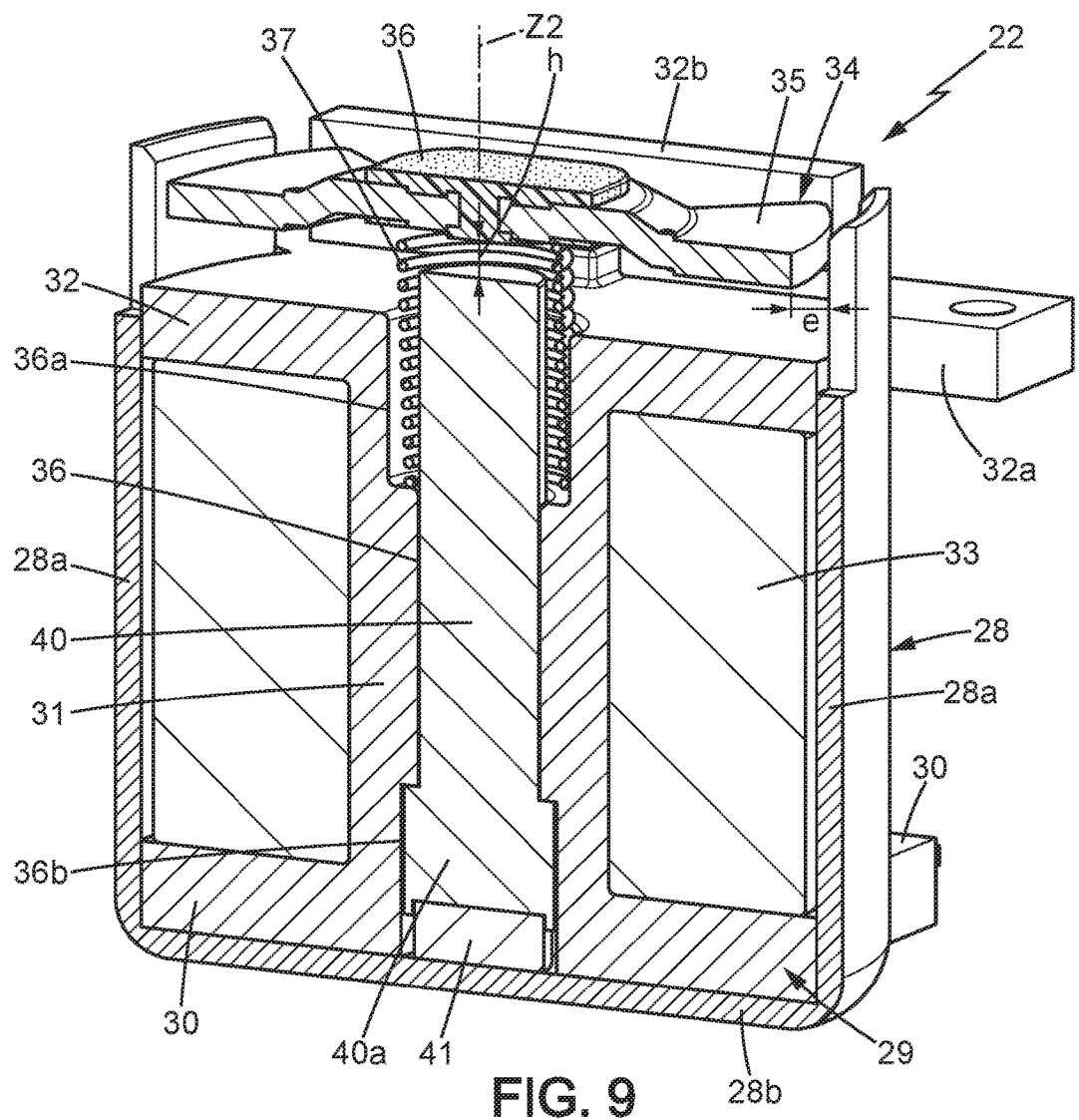
FIG. 9 is an axial cross-section view of the actuator of FIGS. 7 and 8.

Alternatively, as diagrammatically shown in FIG. 11, the vibration damping device 1 may not contain a device for generating energy 15, but another source of energy such as a battery 42 (BATT) supplying the control device 25. This battery could for example be arranged in the aforementioned interior space 7a, which would then be suitable for being opened in order to replace the battery. In light of the low electrical consumption, such a replacement could take place at rather long time intervals.

According to another alternative, not shown, the device could comprise a second hydraulic compensating chamber that communicates with the working chamber A via a second constricted passage, and the membrane 5b would separate the pneumatic chamber P from this second compensating chamber. In this case, the actuator 22 could control the operation of this second compensating chamber in order to selectively, either allow movements of the liquid between the working chamber A and the second compensating chamber (valve 36 open), or prohibit movements of liquid between the working chamber A and the second compensating chamber (valve 36 closed).

The invention claimed is:

1. A hydraulic vibration damping device intended to be inserted for the purposes of damping between first and second rigid elements, with this vibration damping device comprising:
   first and second armatures intended to be fixed to the two rigid elements to be joined,
   an elastomer body that connects first and second armatures together and which delimits at least partially a first hydraulic chamber,
   a second hydraulic chamber which is delimited by a deformable wall and which communicates with the first hydraulic chamber by the intermediary of a constricted passage, with the first and second hydraulic chambers and with the constricted passage forming a hydraulic circuit filled with liquid,
   a closed box integral with the second armature and delimiting an interior space separated from the second hydraulic chamber by said deformable wall,
   and an electrical system comprising an electronic control device, at least one sensor and an electrical actuator controlled by the control device according to information received from the sensor, said actuator being suitable for controlling the vibration damping behaviour of the vibration damping device, and with at least the control device being arranged in the interior space of said box,
   wherein the box is sealed and comprises at least one flexible wall separating from the atmosphere, the interior space of said box, said flexible wall being in permanent contact with the atmosphere.

2. The vibration damping device according to claim 1, wherein the actuator is also contained in the interior space of the box.

3. The vibration damping device according to claim 1, wherein the sensor is also contained in the interior space of the box.

4. The vibration damping device as claimed in claim 1, wherein the electrical system further comprises a device for generating electric current that comprises on the one hand, a microturbine rotatably mounted in the constricted passage and on the other hand, a generator coupled to the microturbine in order to produce an electric current when the microturbine is rotating, with at least the generator being contained in the interior space of the box.

5. The vibration damping device according to claim 4, wherein the electrical system further comprises:
   a converter adapted for converting into direct current an electric current produced by the generator,
   a device for storing electrical energy supplied by the converter and supplying the control device,
   the converter and the device for storing electrical energy being arranged in the interior space of the box.

6. The vibration damping device as claimed in claim 1, wherein said sensor is a vibration sensor.

7. The vibration damping device as claimed in claim 1, wherein said actuator is adapted to selectively block or leave free a mobile wall which partially delimits the first hydraulic chamber.

8. The vibration damping device according to claim 7, wherein said mobile wall is flexible and said vibration damping device comprises a pneumatic chamber which is delimited towards the actuator by a bottom provided with an orifice and which is separated from the first hydraulic chamber by said mobile wall,
   the actuator comprising an actuating member mobile between first and second positions, said actuating member being elastically solicited by a spring towards the first position, with the actuating member being adapted for closing off said orifice under the bias of the spring when said actuating member is in the first position, with the spring being adapted to allow the actuating member to temporarily open said orifice in case of excessive pressure in the pneumatic chamber.

\* \* \* \* \*